(12) United States Patent
Strang

(10) Patent No.: US 11,109,528 B2
(45) Date of Patent: Sep. 7, 2021

(54) SYSTEM AND METHOD FOR PROCESSING A GROUND WITH A MOBILE ROBOT UNIT

(71) Applicant: Vorwerk & Co. Interholding GmbH, Wuppertal (DE)

(72) Inventor: Benjamin Strang, Solingen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 16/061,752

(22) PCT Filed: Nov. 22, 2016

(86) PCT No.: PCT/EP2016/078407
§ 371 (c)(1),
(2) Date: Jun. 13, 2018

(87) PCT Pub. No.: WO2017/102260
PCT Pub. Date: Jun. 22, 2017

(65) Prior Publication Data
US 2018/0368312 A1 Dec. 27, 2018

(30) Foreign Application Priority Data

Dec. 16, 2015 (DE) ...................... 10 2015 121 972.7

(51) Int. Cl.
*A01D 34/00* (2006.01)
*A47L 9/28* (2006.01)

(52) U.S. Cl.
CPC .......... *A01D 34/008* (2013.01); *A47L 9/2805* (2013.01); *A47L 9/2852* (2013.01); *A47L 2201/022* (2013.01); *A47L 2201/04* (2013.01); *A47L 2201/06* (2013.01)

(58) Field of Classification Search
CPC ........................... A01D 2101/00; Y10S 901/01
See application file for complete search history.

(56) References Cited

U.S. PATENT DOCUMENTS

| | | | |
|---|---|---|---|
| 4,919,224 A * | 4/1990 | Shyu .................... | A01D 34/008 180/168 |
| 5,438,817 A | 8/1995 | Nakamura | |
| 10,120,382 B2 | 11/2018 | Ishijima et al. | |

(Continued)

FOREIGN PATENT DOCUMENTS

| CN | 102053623 A | 5/2011 |
|---|---|---|
| CN | 102830675 A | 12/2012 |

(Continued)

*Primary Examiner* — Peter D Nolan
*Assistant Examiner* — Ce Li Li
(74) *Attorney, Agent, or Firm* — The Webb Law Firm

(57) ABSTRACT

A system for processing a ground at least partially in an outdoor region, in particular removing dirt or grass cuttings, includes a base station and a mobile robot unit. The system further includes at least one detection device for detecting at least one environmental variable, and a controller which influences the operating mode of the mobile robot unit in accordance with the value of at least one of the environmental variables detected by the at least one detection device. A method for controlling a mobile robot unit for processing a ground at least partially in an outdoor region, in particular removing dirt or grass cuttings, is also provided.

15 Claims, 3 Drawing Sheets

(56) References Cited

U.S. PATENT DOCUMENTS

| | | | | |
|---|---|---|---|---|
| 2009/0224881 | A1* | 9/2009 | Koon | G01W 1/02 |
| | | | | 340/7.48 |
| 2011/0166701 | A1* | 7/2011 | Thacher | A01G 25/00 |
| | | | | 700/245 |
| 2012/0265391 | A1 | 10/2012 | Letsky | |
| 2014/0222197 | A1* | 8/2014 | Letsky | G05D 1/0274 |
| | | | | 700/245 |
| 2015/0325096 | A1* | 11/2015 | Hatch | E05F 15/71 |
| | | | | 340/601 |
| 2016/0174459 | A1* | 6/2016 | Balutis | G05D 1/0221 |
| | | | | 701/25 |
| 2016/0195876 | A1* | 7/2016 | Mattsson | A01D 34/008 |
| | | | | 701/25 |
| 2016/0334811 | A1* | 11/2016 | Marten | G05B 15/02 |
| 2016/0366813 | A1* | 12/2016 | Haneda | A01B 69/008 |
| 2017/0020064 | A1 | 1/2017 | Doughty et al. | |
| 2017/0155703 | A1* | 6/2017 | Hao | H04L 67/12 |

FOREIGN PATENT DOCUMENTS

| | | |
|---|---|---|
| DE | 3816622 A1 | 11/1989 |
| DE | 102006027018 A1 | 12/2007 |
| DE | 102010006531 A1 | 8/2011 |
| DE | 102011084594 A1 | 4/2013 |
| DE | 102012111589 A1 | 6/2014 |
| EP | 2330471 A2 | 6/2011 |
| JP | 346009 A | 2/1991 |
| JP | 6113607 A | 4/1994 |
| JP | 2012105557 A | 6/2012 |
| JP | 2016533736 A | 11/2016 |
| WO | 2007140930 A1 | 12/2007 |
| WO | 2015022672 A2 | 2/2015 |
| WO | 2016002082 A1 | 1/2016 |
| WO | 2016102144 A1 | 6/2016 |
| WO | 2017019493 A1 | 2/2017 |

* cited by examiner

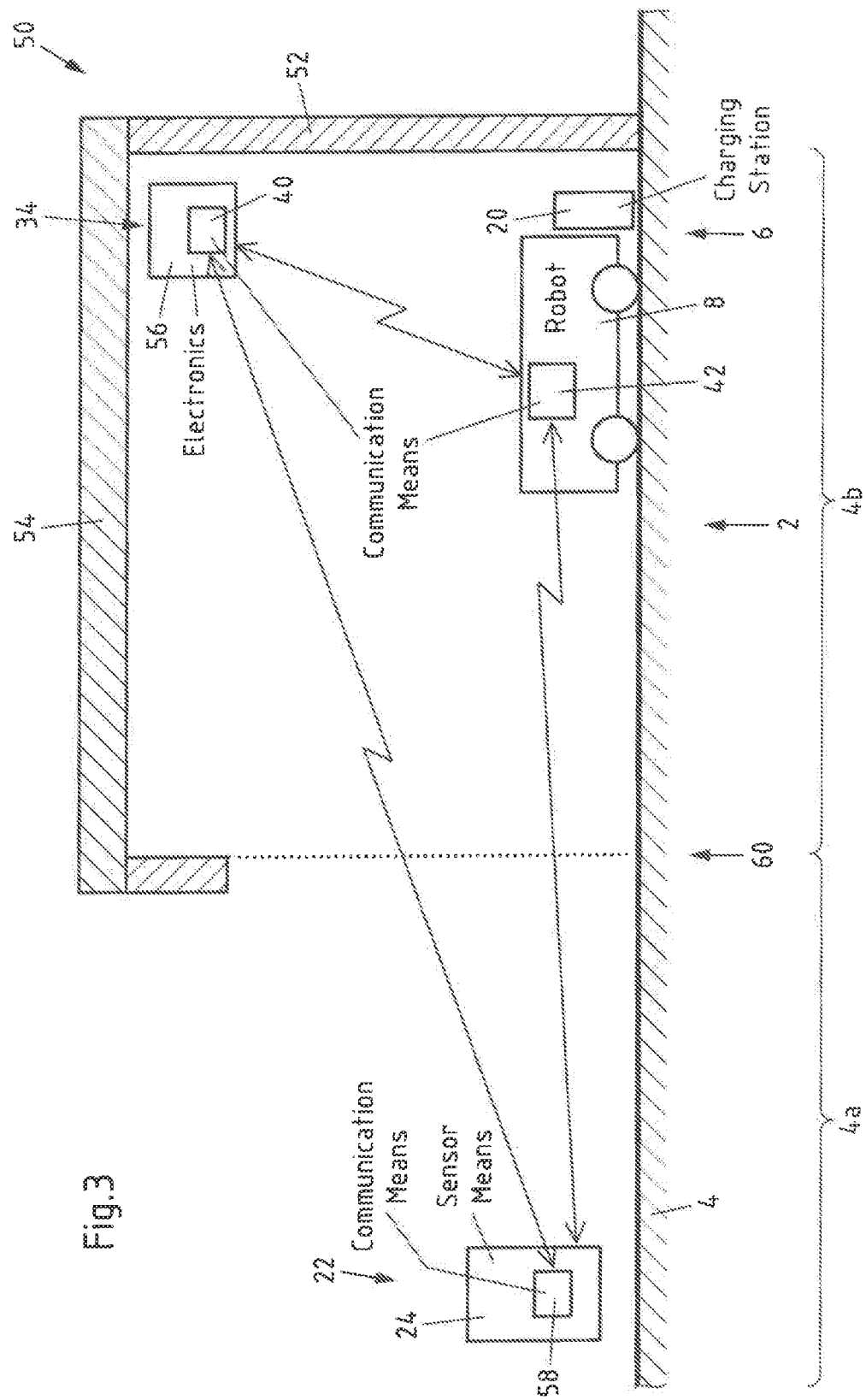

SYSTEM AND METHOD FOR PROCESSING A GROUND WITH A MOBILE ROBOT UNIT

CROSS-REFERENCE TO RELATED APPLICATIONS

This application is the United States national phase of International Application No. PCT/EP2016/078407 filed Nov. 22, 2016, and claims priority to German Patent Application No. 10 2015 121 972.7 filed Dec. 16, 2015, the disclosures of which are hereby incorporated in their entirety by reference.

BACKGROUND OF THE INVENTION

Field of the Invention

The invention relates to a system for processing ground at least partially in an outdoor area, in particular for removing contamination or cutting grass, having a base station and having a mobile robot unit, in particular a vacuum robot, sweeping robot or grass-cutting robot, wherein at least one detection means for detecting at least one environmental variable is provided and wherein a control is provided, which influences the operating mode of the mobile robot unit according to the value of at least one environmental variable detected by the at least one detection means. The invention also relates to a method for controlling a mobile robot unit for processing ground at least partially in an outdoor area.

Description of Related Art

As independently moving and navigating robot units, cleaning robots in the form of vacuum robots and sweeping robots are known in particular. Vacuum robots are capable of independently cleaning dust and coarse material off hard floors, such as tiled floors or stone floors. Vacuum robots can also be used accordingly to clean dust, leaves or other dirt from balconies, terraces and path areas provided that the balcony area or similar area to be cleaned is delimited accordingly. Sweeping robots clean the floor purely mechanically by means of brushes and collecting containers without using a suction airflow.

However, continued use of a vacuum robot on outdoor areas such as balconies, terraces and path areas is only possible to a limited extent since, unlike grass-cutting robots, known vacuum cleaner models are not rain-resistant. Furthermore, in contrast to appropriate use within a flat or in a house, solar radiation, heat and cold would also strain on the vacuum robot heavily.

Furthermore, to use a vacuum robot in outdoor areas, it is necessary to ensure that the outdoor area to be cleaned is dry, that there are no puddles of water and that the vacuum robot therefore does not damage itself by sucking in water. A good cleaning result owing to good dust pick-up is likewise generally only possible with dry surfaces and dry suction material.

A typical base station for a vacuum robot has a mains connection and charging contacts via which a vacuum robot can be charged in a docked position. Beyond the simple charging functionality, additional functions of a base station, for example the emptying of the dust compartment of the vacuum robot, are known from the prior art.

As independently moving and navigating robot units, grass-cutting robots are also known which usage in damp or wet environments is also possible. When using grass-cutting robots, however, it has hitherto not been possible to automatically take into account medium-term or long-term weather conditions since the grass needs to be cut more frequently when the weather is wet or damp for relatively long periods and the frequency with which the grass is cut should be reduced when the weather is dry for relatively long periods.

For grass-cutting robots, both base stations having a charging function and robot garages are known. The garages are intended to protect the grass-cutting robots from sun and rain and to realize anti-theft protection. Such a garage substantially comprises a rear part having the charging station and electrical contacts and a roof which can be folded upwards as required.

Other garages for grass-cutting robots have an automatic garage door which is opened and closed for example in a time-controlled manner according to the schedule of the grass-cutting robot.

WO 2007/140930 A1 discloses a system having a charging station and an autonomously operating lawn mower, wherein the lawn mower has a rain sensor and wherein the lawn mower returns to the charging station in the event of rain.

SUMMARY OF THE INVENTION

Therefore, the technical problem on which the present invention is based is to achieve an improvement in the working result of a mobile robot unit whilst improving the operational reliability.

The technical problem described above is achieved according to the invention by a system for processing ground at least partially in an outdoor area, in particular for removing contamination or cutting grass, having a base station and having a mobile robot unit, in particular a vacuum robot, a sweeping robot or a grass-cutting robot, wherein at least one detection means for detecting at least one environmental variable is provided and in that a control is provided, which influences the operating mode of the mobile robot unit according to the value of at least one environmental variable detected by the at least one detection means, wherein the detection means are formed as hart of a home weather station.

Through the detection of at least one environmental variable, it is in particular possible to detect the weather activity in the area in which the robot unit is to be used. On the basis of the measurement of the at least one environmental variable, the at least one detection means generates a signal which is transmitted to the control. The signal of a detection means or the signals of a plurality of detection means is/are evaluated in the control and a control signal for influencing the operating mode of the mobile robot unit is generated if appropriate.

The detection means are formed as part of a home weather station. Therefore, the at least one environmental variable is transmitted to the control via a data connection. The home weather station can hereby have a direct connection to the control here or be part of a home network with further appliances. Therefore, a weather station can not only supply environmental variables for the use of the mobile robot unit, but also for further weather-dependent adjustments of blinds, curtains or air-conditioning systems.

Possible environmental variables which are used here are: temperature, precipitation, amount of precipitation, humidity, ground moisture, wind strength, air pressure, wherein past, and possibly also future, time sequences of the environmental variables can be stored and taken into account.

The system according to the invention therefore obtains information relating in particular to the current weather so that the use of the robot unit in possibly poor weather conditions can be restricted or prevented. The system described can therefore also partly serve as a weather station or constitute part of a weather station.

In a preferred manner, the detection means are formed as a sensor for the at least one environmental variable. The detection means can therefore be formed as a temperature sensor, precipitation sensor, sensor for the amount of precipitation, humidity sensor, ground moisture sensor, wind strength sensor or air pressure sensor. The detection means furthermore each have a communication interface for transmitting the measurement signals to the control. The communication interface can be formed via cable or radio. It is additionally possible for either the detection means or the control to record the at least one environmental variable so that a temporal development of the at least one environmental variable can be observed and evaluated.

The detection means can alternatively or additionally have a communication interface and the detection means are then suitable for downloading weather data as the at least one environmental variable. Possible communication interfaces are wire-connected or wireless connections, for example LAN, WLAN or a mobile data connection. The weather data here can contain weather data for the previous hours or days, current weather data or weather forecasts for the following hours or days. Therefore, depending on the application, the past or future weather activity and the current weather situation can be used for influencing the operating mode of the mobile robot unit.

The detection means can be connected to the internet via the communication interface so that weather data can be retrieved from the internet. The detection means can also be connected to a home network or to an individual home appliance, for example a home weather station, via the communication interface. Therefore, it is not only possible to transmit weather data via the communication interface but also to transmit bidirectional operating data and applications planning data in respect of the mobile robot unit. These data can then in turn be processed, further used, supplemented or included in superordinate planning by further appliances connected to the home network.

In the same way as it is possible to optionally select the location of the detection means, it is also possible to arrange the control on the base station, on the robot unit, on the at least one detection means or in the vicinity of the base station. Ultimately, it is only important that the measuring signals of the detection means are detected and evaluated by the control to establish whether or not the operating mode of the mobile robot unit should be influenced. A corresponding control signal is then generated as appropriate.

Furthermore, part of a home network can constitute the control so that the control does not constitute a stand-alone part. It is therefore possible to dispense with a separate control, and a home network which may be present for controlling a plurality of components of the home can also assume the control task.

Moreover, for each LAN, WLAN or direct internet connection, the sensor technology of the detection means and the base station can each input their data into the home network or an internet server communicating with this network for further processing.

In a preferred manner, the control is designed to control a blocking means, in particular an exit barrier of a covered area arranged at the base station. In this case, the robot unit is located at the base station to be charged with electrical energy or simply to wait for a subsequent processing cycle. A subsequent processing cycle can be specified for example by a corresponding programming of a time control. To activate the blocking means, a signal can then be sent to the robot unit, for example, to prevent exit, even if the time control would actually initiate a subsequent processing cycle. It is also possible to activate an exit barrier as the blocking means, wherein an exit barrier can be formed as a garage door of a garage or as a bar and wherein the robot unit is prevented from exiting in that the garage door or the bar is held in a closed position. The term garage refers to a covered region as weather protection which, in addition to a roof, can be circumferentially closed on all sides or partially or can simply have a rear wall.

The control can furthermore be designed to generate a terminating signal and to transmit this to the robot unit via communication means, wherein the robot unit has a movement control which is designed to terminate the processing of the ground after receiving the terminating signal and to return to the base station as appropriate. During processing, the robot unit can therefore also be prevented from continuing the processing if environmental conditions are unfavorable, for example if rain is approaching. The robot unit can therefore be protected from damage caused by wet conditions or difficult operating conditions.

The movement control of the robot can moreover have a stored map, wherein the map contains a virtual boundary between the covered spatial area and the non-covered spatial area and wherein the movement control enables or prevents crossing of the virtual boundary according to the value of the least one environmental variable detected by the at least one detection means. A spatial plan of the area to be processed can be used as the map, i.e. an environmental or layout map. Before the robot unit is used, the virtual boundary, which can constitute for example the position of a balcony or terrace door, can be input into the movement control. The line which, owing to a balcony or terrace being sheltered, is set between an area which does not become wet through rain and an area which becomes wet through rain can also be stored as a virtual boundary.

The system described above enables for example a mobile vacuum robot to also be used in an outdoor area since, owing to the inventive detection of at least one environmental variable and owing to the influence on the operating mode of the mobile vacuum robot, the robot can be actively prevented from processing ground which is too damp for picking up dust or, owing to the presence of puddles, could even cause damage to the vacuum robot. This is because vacuum robots are not suitable for sucking up water.

The system described above furthermore enables a mobile grass-cutting robot to be controlled for example such that the frequency with which the grass is cut can be controlled according to weather conditions over a relatively long period. This is because the grass needs to be cut more frequently if the weather is damp or wet for a relatively long period, whilst the grass does not need to be cut so frequently during dry weather conditions over a relatively long period. To this end, it is possible in a preferred manner for a user to pre-set how often the grass should be cut for predetermined weather conditions.

The technical problem demonstrated above is also solved by a method for controlling a mobile robot unit for processing ground at least partially in an outdoor area, in particular for removing contamination or cutting grass, in which at least one environmental variable is detected and evaluated, in which the operating mode of the mobile robot unit is influenced according to the value of one of the at least one detected environmental variables and in which the at least one environmental variable is detected by a part of a home weather station.

Furthermore, crossing of a virtual boundary between a covered spatial area and a non-covered spatial area by the robot unit can be enabled or prevented according to the value of the at least one detected environmental variable.

The technical problem demonstrated above is furthermore solved by A method for controlling a mobile robot unit for processing ground at least partially in an outdoor area, in particular for removing contamination or cutting grass, in which at least one environmental variable is detected and evaluated, in which the operating mode of the mobile robot unit is influenced according to the value of one of the at least one detected environmental variable and in which crossing of a virtual boundary between a covered spatial area and a non-covered spatial area by the robot unit is enabled or prevented according to the value of the at least one detected environmental variable.

The advantages to be achieved by these methods correspond to those which have already been explained above in relation to the system according to the invention.

A preferred embodiment of the method consists in that the robot unit is prevented from exiting a covered area of a base station at the start of a processing the ground.

The method can furthermore include that a processing procedure is aborted and that the robot unit is prompted to return to a covered area of a base station.

BRIEF DESCRIPTION OF THE DRAWINGS

The invention is explained below with the aid of exemplary embodiments with reference to the drawing. The drawing shows:

FIG. 3 a third exemplary embodiment of a system according to the invention.

DESCRIPTION OF THE INVENTION

Figure 1:
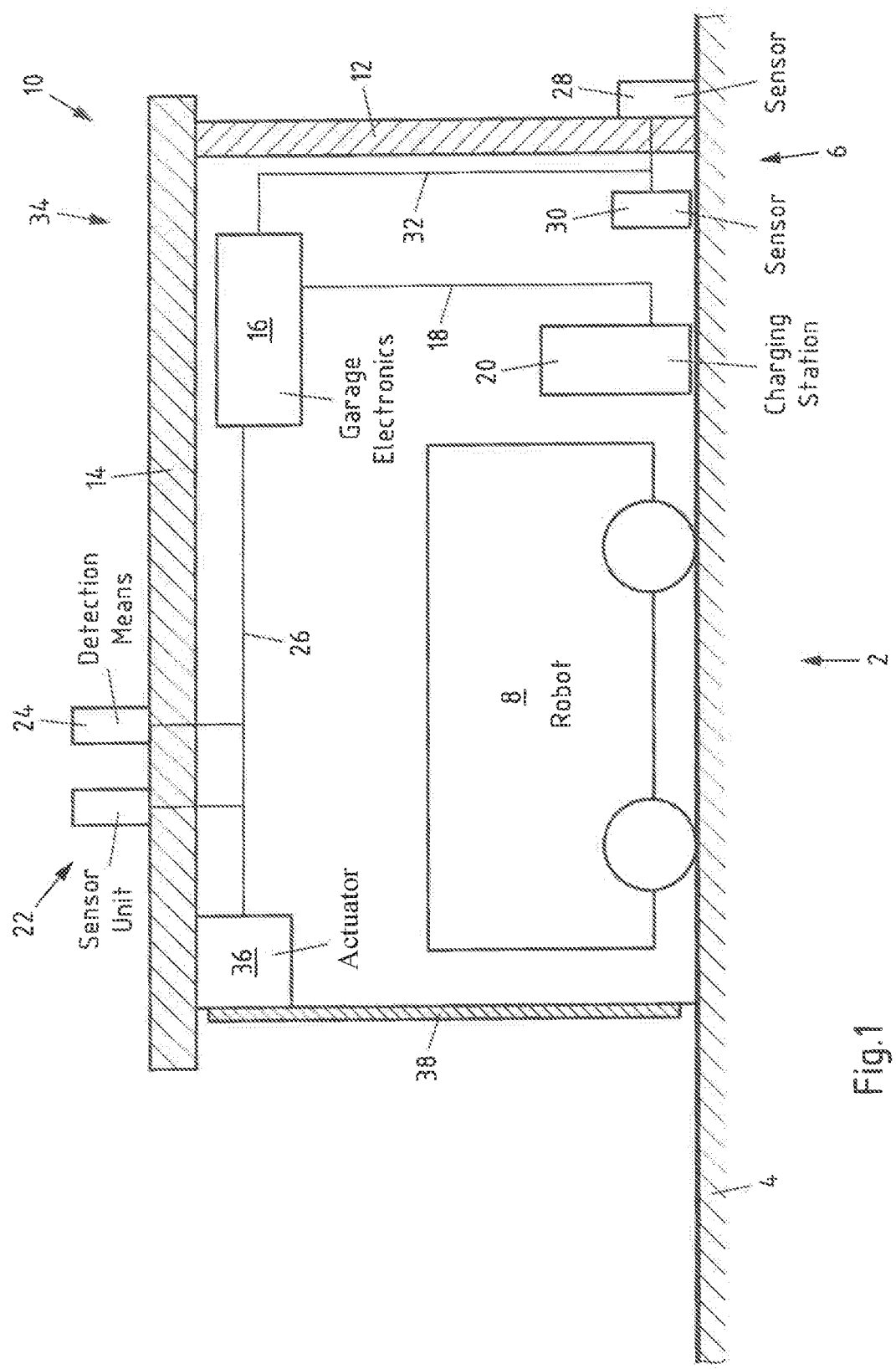
FIG. 1 a first exemplary embodiment of a system according to the invention.

In the description below of the different exemplary embodiments according to the invention, the same components are denoted by the same reference numerals, even though the components in the different exemplary embodiments may differ in terms of their dimension or form.

FIG. 1 shows a first exemplary embodiment of a system 2 according to the invention for processing ground 4 at least partially in an outdoor area, wherein processing here consists in removing contamination from the ground 4. The ground 4 here can be part of a balcony or terrace of a garden.

The system has a base station 6 and a mobile robot unit 8 which is formed as a vacuum robot here and is illustrated merely schematically in FIG. 1.

The base station 6 has a garage 10 having a rear wall 12 and a roof 14. The roof 14 protects the vacuum robot 8 in particular when the base station 6 is arranged outdoors and is exposed to environmental influences. The garage 10 can also have not yet illustrated side walls which protect the vacuum robot 8 laterally.

The base station 6 has garage electronics 16 which are connected on the one hand to an electrical supply. The electrical supply can be a mains connection, an accumulator or a photovoltaic element. The garage electronics 16 are connected on the other hand to a charging station 20 via a line 18 and supply the charging station 20 with electrical energy. Data communication can moreover also take place between the vacuum robot 8 and the garage electronics 16 via the line 18.

The vacuum robot 8 is a self-propelling and self-navigating robot, known per se, which is operated by means of at least one accumulator and has a fan for generating a suction air flow, a dust chamber for collecting dust and other particles, a suction mouth for sucking in dust and other particles, at least three wheels, of which at least two are motor driven, and a control for carrying out a vacuuming procedure.

According to the invention, at least one of the detection means, described below, for detecting at least one environmental variable is provided in or on the base station 6. A sensor unit 22 is arranged on the roof 14 of the base station 6, which has at least one detection means 24 in the form of one of the sensor types: temperature sensor, precipitation sensor, sensor for the amount of precipitation, humidity sensor, ground moisture sensor, wind strength sensor or air pressure sensor. A combination of several or all of the said sensor types is preferable. The sensor unit 22 is connected to the garage electronics 16 via the line 26 and can transmit measurement signals of the at least one detection means 24 to the garage electronics 16. The detection means 24 can be arranged distributed on two or more sensor units 22.

A further detection means in the form of a sensor 28 which measures the moisture on the surface of the ground and/or within the underground is arranged on the outside of the rear wall 12. A detection means in the form of a sensor 30 for determining moisture within the garage 10 is furthermore provided within the garage 10 for realizing a protective function. Both sensors 28 and 30 are connected to the garage electronics 16 via a line 32.

The realization of the present invention only requires the presence of one of the detection means 24, 28 or 30, although it is preferable to provide a plurality of these detection means to detect different environmental variables and enable the environmental conditions in the area of the ground to be processed to be determined from these environmental variables.

A control 34 is furthermore provided in the garage electronics 16, which influences the operating mode of the mobile vacuum robot 8 according to the value of at least one environmental variable detected by the at least one detection means 24, 28 or 30. To this end, for example, a precipitation sensor 24 can signal to the sensor unit 22 via the line 26 of the control 34 that it is currently raining. The control 34 can deduce from this measurement signal that processing of the ground 4 by the vacuum robot 8 should be prevented. Therefore, the control 34 generates a control signal which is transmitted to an electromechanical actuator 36 via the line 26 so that the actuator 36 closes a garage door 38 as a blocking means. The electromechanical actuator 36 can be formed as a motor-gear unit, as a cable pull mechanism or pneumatically. The garage door 38 can be realized as a roller door or as a barrier or post.

In any case, in the closed state, the garage door 38 prevents the mobile vacuum robot 8 from moving out of the base station 6 when a time control initiates a new processing cycle, for example. The vacuum robot 8 then finds no way out of the garage 10 and aborts the processing cycle again.

The procedure has been described above with reference to a moisture sensor 24. It is likewise or additionally possible to use a wind sensor 24 to assess whether there is a too strong wind in the area of the ground 4 to be processed. This is because, if the wind is too strong, it makes little sense to vacuum the ground 4 since parts of the ground 4 which have already been cleaned become continually covered with dust and particles again. A temperature sensor 24 can furthermore be used to establish whether the outdoor temperature is too high or too low to use the vacuum robot 8.

Figure 2:
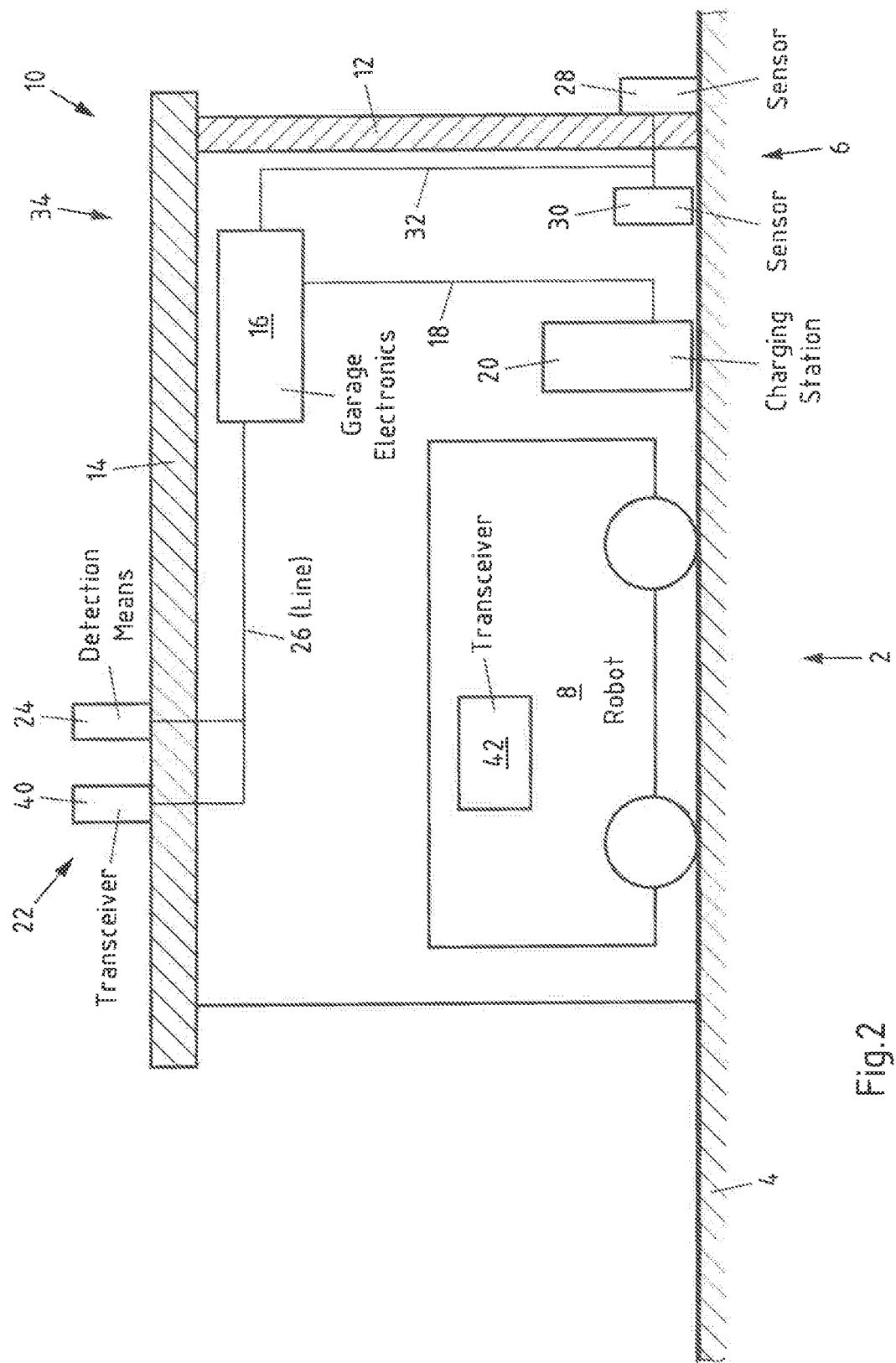
FIG. 2 a second exemplary embodiment of a system according to the invention.

FIG. 2 shows a second exemplary embodiment of a system 2 according to the invention. In contrast to FIG. 1, the garage 10 has a garage transceiver 40 which is connected to the garage electronics 16 via the line 26 and the vacuum robot has a robot transceiver 42 for wireless communication between the control 34 and the vacuum robot 8.

If, on the basis of at least one environmental variable which has been transmitted to the control 34 by the at least one detection means 24, 28 or 30, the control 34 establishes an environmental situation which is not suitable for the vacuum robot 8 to be used, a control signal is transmitted by the control 34 to the vacuum robot 8 via the transceivers 40 and 42 so that the vacuum robot 8 remains within the garage 10 even if a time control of the vacuum robot 8 would actually initiate a new processing cycle.

The inventive system 2 illustrated in FIG. 2 also enables that, if the vacuum robot 8 is within a processing cycle, i.e. it has already processed part of the ground 4, for example, and if the environmental conditions change, for example as a result of rain, the control 34 transmits a signal to the vacuum robot 8 which results in the processing cycle being aborted and prompts the vacuum robot 8 to return to the base station again. The control 34 is therefore designed to generate a terminating signal and to transmit this to the vacuum robot 8 via communication means 40, 42. The vacuum robot 8 can terminate the processing of the ground 4 by means of an integrated movement control (not illustrated) after receiving the terminating signal and then return back to the base station 6 and into the garage 10 again.

The two exemplary embodiments of systems 2 according to the invention illustrated in FIGS. 1 and 2 can also be modified or supplemented in that a detection means 24 is formed as a communication interface to a network, for example to the internet or to a home network, and in that the detection means 24 are suitable for downloading weather data as the at least one environmental variable.

The communication interface can be formed as wire-connected or wireless here, i.e. as a LAN, WLAN or as a mobile data connection for example. The weather data can contain past weather data, current weather data and/or weather forecasts. The control of the mobile robot unit, in this case formed as a vacuum robot 8, according to environmental variables can therefore also be implemented solely as a result of data downloaded from the internet. The measurement of environmental variables in the direct vicinity of the base station 6 and the vacuum robot 8 is then no longer necessary or can be used in a supplementary manner.

FIG. 3 shows a third exemplary embodiment of a system 2 according to the invention, likewise for processing ground 4 at least partially in an outdoor area 4a and in an indoor area 4b. The processing here also consists in removing contamination from the ground 4. The system has a base station 6 and a mobile robot unit 8 which, in this case, is formed as a vacuum robot.

The base station 6 is arranged in a room 50 having walls 52 and a ceiling 54. Electronics 56, which are connected to an electrical supply, are arranged in the room 50. A charging station 20 is likewise arranged in the room 50 and constitutes the base station 6 here since there is no need to provide further protection against external influences within the room 50 by means of a garage.

The control 34 already described above is arranged within the electronics 56 in the room 50, i.e. in the vicinity of the base station 6. The vacuum robot 8 can be charged by means of the charging station 20 described above. The charging station 20 is supplied with electrical energy via a line (not illustrated). A connection to the electronics 56, such as that shown in the exemplary embodiments according to FIGS. 1 and 2, is not required.

A sensor unit 22 having a least one sensor means 24, as has essentially already been explained for the other exemplary embodiments, is furthermore arranged in the outdoor area 4a and can therefore detect weather data as environmental variables. The sensor unit 22 and the control 34 are in communication and can exchange data with one another via wireless communication between a communication means 58 in the sensor unit 22 and a communication means 40 in the control 34.

As FIG. 3 furthermore shows, the vacuum robot 8 is equipped with a communication means 42 with which data is likewise exchanged between the vacuum robot 8 and the control 34 via a wireless radio connection. Wireless communication between the vacuum robot 8 and the sensor unit 22 is likewise possible via the communication means 42 and 58. The data relating to the at least one environmental variable determined by the sensor means 24 can therefore be exchanged both between the sensor unit 22 and the control 34 and/or alternatively between the sensor unit 22 and the vacuum robot 8.

If the communication takes place directly between the sensor unit 22 and the vacuum robot 8, for example, the separate control 34 can be omitted and the control can be integrated in the vacuum robot 8 or in the sensor unit 22. The communication for transmitting the data of the at least one environmental variable can likewise also take place solely between the sensor unit 22 and the separate control 34, whilst the control 34 then influences the control of the vacuum robot 8 by means of the wireless connection to the vacuum robot 8.

The control of the vacuum robot 8 can then take place based on the at least one environmental variable in such a way that the vacuum robot 8 only takes place within the indoor area 4b if the sensor unit 22 determines rain, for example, and vacuuming the ground in the outdoor area 4a is not possible or could result in damage to the vacuum robot 8.

To this end, it is preferred that a movement control integrated in the vacuum robot 8 has a stored map, that the map contains a virtual boundary 60 (dotted line) between the covered spatial area, i.e. the indoor area 4b, and the non-covered area, i.e. the outdoor area 4a, and that crossing of the virtual boundary 60 is enabled or prevented by the movement control according to the value of the at least one environmental variable detected by the at least one detection means 24.

The map therefore defines an environmental or layout map, and a spatial plan, i.e. an area of the ground which is to be processed, is generated according to the at least one environmental variable. If the value of the at least one environmental variable does not constitute an obstacle to also enabling the vacuum robot 8 to vacuum the outdoor area 4a, then the spatial plan based on the map is determined such that both the indoor area 4b and the outdoor area 4a are cleaned.

If, on the other hand, the value of the at least one environmental variable constitutes an obstacle and the vacuum robot 8 should therefore only clean the indoor area 4b, the spatial plan based on the map is determined such that only the indoor area 4b, and not the outdoor area 4a, is cleaned. The indoor area 4b is therefore only cleaned as far as the virtual boundary 60.

FIG. 3 shows the position of the virtual boundary between the outdoor area 4a and the indoor area 4b. It is likewise possible to draw the virtual boundary between a covered part of the outdoor area 4a and a non-covered part of the outdoor area 4a. Therefore, in the event of rain, it is also possible for the covered part of the outdoor area, which remains extensively dry, to be cleaned together with the indoor area. 4b The exemplary embodiments explained above have vacuum robots 8 as robot units. However, the robot unit can also be formed as a sweeping robot for cleaning the ground. The robot unit can likewise be formed as a grass-cutting robot and have corresponding control means as described for the vacuum robot.

The invention claimed is:

1. A system for processing of a ground at least partially in an outdoor area, the system comprising:
a base station; and
a mobile robot unit;
wherein at least one detection means for detecting at least one environmental variable is provided,
wherein a control is provided, which influences the operating mode of the mobile robot unit according to a value of the at least one environmental variable detected by the at least one detection means and transmitted to the control from the at least one detection means,
wherein the at least one detection means are formed as part of a home weather station,
wherein the at least one detection means are formed as a sensor for the at least one environmental variable, and
wherein, when the mobile robot unit is in a covered spatial area and the control, based on the environmental variable, establishes that it is not suitable for the mobile robot unit to be used when a time control of the mobile robot unit initiates a new processing cycle of the mobile robot unit, the control causes an exit barrier of the covered spatial area to be in a closed state preventing the mobile robot unit from exiting the covered spatial area and the control transmits a signal that causes the mobile robot unit to remain in the covered spatial area.

2. The system according to claim 1, wherein the at least one environmental variable is at least one of: temperature, precipitation, amount of precipitation, humidity, ground moisture, wind strength, and air pressure.

3. The system according to claim 1, wherein the at least one detection means have a communication interface and are suitable for downloading weather data as the at least one environmental variable via the communication interface.

4. The system according to claim 1, wherein part of a home network forms the control.

5. The system according to claim 1,
wherein the control is designed to generate a terminating signal and
wherein the mobile robot unit is designed to terminate the processing of the ground in response to the terminating signal and to return to the base station.

6. The system according to claim 5,
wherein the control has a stored map,
wherein the map contains a virtual boundary between the covered spatial area and a non-covered spatial area, and
wherein the control enables or prevents crossing of the virtual boundary by the mobile robot unit according to the value of the at least one environmental variable detected by the at least one detection means.

7. The system of claim 1, wherein the processing comprises one of removing contamination and cutting grass.

8. The system of claim 1, wherein the exit barrier of the covered spatial area is arranged at the base station.

9. A method for controlling a mobile robot unit for processing of a ground at least partially in an outdoor area, the method comprising:
detecting, by a sensor, and evaluating, by a control, at least one environmental variable transmitted to the control from the sensor; and
influencing, by the control, an operating mode of the mobile robot unit according to a value of the at least one environmental variable,
wherein the at least one environmental variable detected by the sensor for the at least one environmental variable which is part of a home weather station, and
wherein, when the mobile robot unit is in a covered spatial area and the control, based on the environmental variable, establishes that it is not suitable for the mobile robot unit to be used when a time control of the mobile robot unit initiates a new processing cycle of the mobile robot unit, the control causes an exit barrier of the covered spatial area to be in a closed state preventing the mobile robot unit from exiting the covered spatial area and the control transmits a signal that causes the mobile robot unit to remain in the covered spatial area.

10. The method according to claim 9, further comprising preventing the mobile robot unit from exiting the covered spatial area of a base station at a start of a processing of the ground.

11. The method according to claim 9, further comprising aborting a processing procedure; and
prompting the mobile robot unit to return to the covered spatial area of a base station.

12. The method according to claim 9, further comprising enabling or preventing a crossing of a virtual boundary between the covered spatial area and a non-covered area by the mobile robot unit according to the value of the at least one detected environmental variable.

13. A method for controlling a mobile robot unit for processing of a ground at least partially in an outdoor area, the method comprising:
detecting, by a sensor, and evaluating, by a control, at least one environmental variable transmitted to the control from the sensor,
influencing, by the control, an operating mode of the mobile robot unit according to a value of the at least one detected environmental variable, and
enabling or preventing a crossing of a virtual boundary between a covered spatial area and a non-covered spatial area by the mobile robot unit according to the value of the at least one detected environmental variable, and
wherein, when the mobile robot unit is in the covered spatial area and the control, based on the environmental variable, establishes that it is not suitable for the mobile robot unit to be used when a time control of the mobile robot unit initiates a new processing cycle of the mobile robot unit, the control causes an exit barrier of the covered spatial area to be in a closed state preventing the mobile robot unit from exiting the covered spatial area and the control transmits a signal that causes the mobile robot unit to remain in the covered spatial area.

14. The method according to claim 13, further comprising preventing the mobile robot unit from exiting the covered spatial area of a base station at a start of a processing of the ground.

15. The method according to claim 13, further comprising:
   aborting a processing procedure; and
   prompting the mobile robot unit to return to the covered spatial area of a base station.

\* \* \* \* \*